Figure 8:
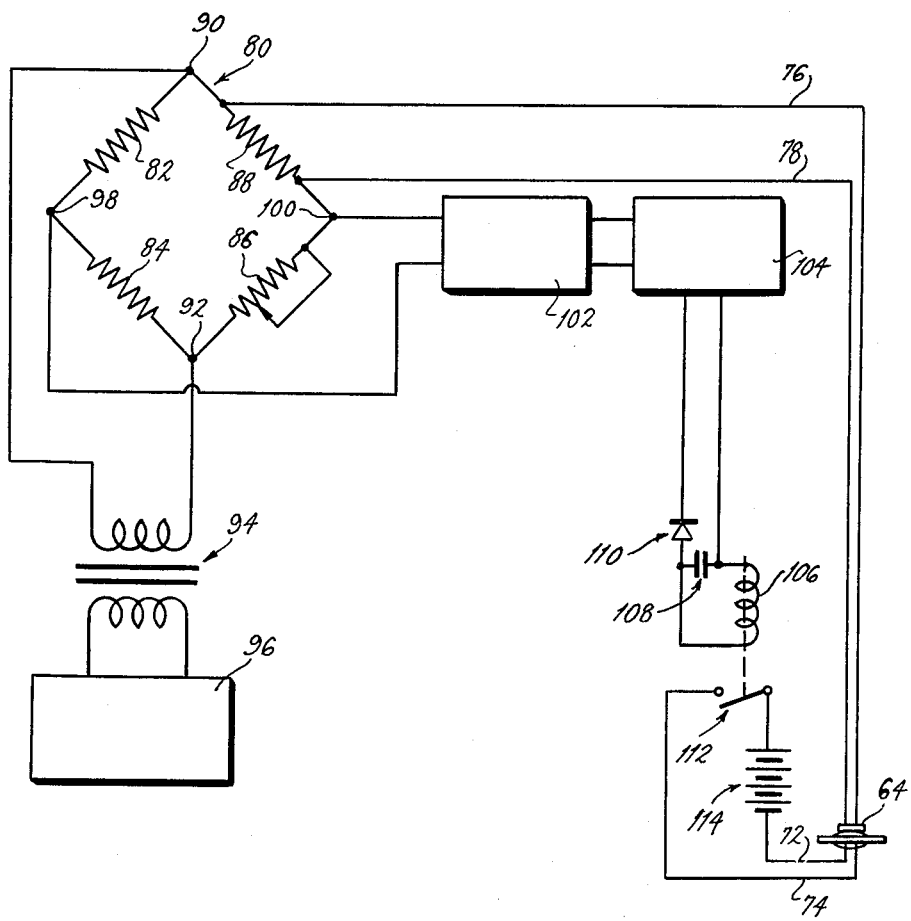

May 7, 1963 — M. L. SCHIMMEL — 3,088,478
VALVE DEVICE
Filed Feb. 29, 1960 — 2 Sheets-Sheet 1
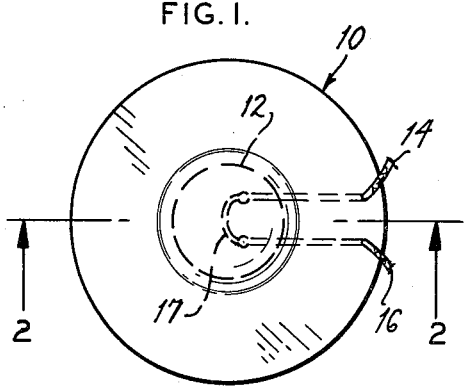
FIG. 1.
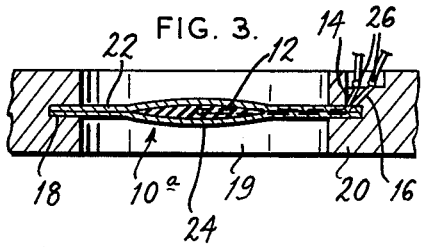
FIG. 3.
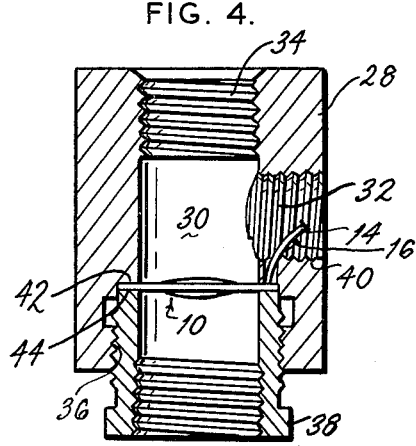
FIG. 4.
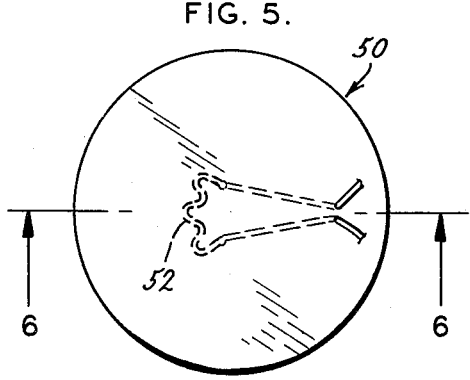
FIG. 2.
FIG. 5.
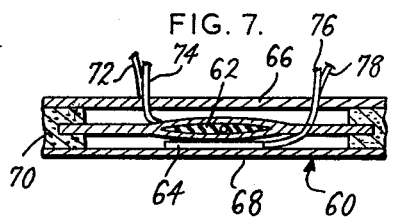
FIG. 7.
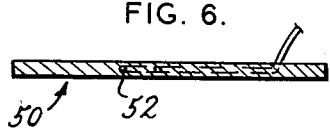
FIG. 6.
INVENTOR.
MORRY L. SCHIMMEL
BY
Gravely, Lieder & Woodruff
ATTORNEYS INVENTOR.
MORRY L. SCHIMMEL
BY
Gravely, Lieder & Woodruff
ATTORNEYS United States Patent Office 3,088,478
Patented May 7, 1963

3,088,478
VALVE DEVICE
Morry L. Schimmel, University City, Mo., assignor to McDonnell Aircraft Corporation, St. Louis, Mo., a corporation of Maryland.
Filed Feb. 29, 1960, Ser. No. 11,634
5 Claims. (Cl. 137—68)

The present invention relates generally to fluid control means and more particularly to a rupturable fluid control device such as a diaphragm.

Many fluid control means have been devised heretofore. Most of the known devices, however, are in the nature of valves which are opened and closed in response to certain demands made upon them, and some are also in the nature of members which rupture or burst when the pressure differential across them causes their tensile strength to be exceeded. For the most part the known means are relatively expensive and cumbersome to make and use and are usually slow operating and unreliable and unpredictable for many applications. These and other disadvantages of the known devices are overcome by the present invention which teaches the use and construction of a rupturable member which is relatively inexpensive to make and use and which is extremely fast acting and reliable and can be controlled in an extremely precise and predictable manner. Briefly the present device comprises a diaphragm member adapted to be positioned to control communication between adjacent chambers, said diaphragm member having means associated therewith for rupturing or weakening said member whereby an opening is formed therethrough which establishes communication between the chambers, said weakening or rupturing means being activated in response to a preselected control impulse.

It is therefore a principal object of the present invention to provide rupturable valve means.

Another object is to provide inexpensive means for controlling communication between adjacent chambers.

Another object is to provide extremely fast acting valve means.

Another object is to provide valve means which can be controlled with very precise accuracy.

Another object is to provide for accurately controlling the bursting of a diaphragm member.

Another object is to provide greater reliability and predictability in the weakening or rupturing of a diaphragm or similar device.

These and other objects and advantages of the present device will become apparent after considering the following detailed specification which covers several preferred embodiments of the present device in conjunction with the accompanying drawing:

In the drawing:
FIG. 1 is a plan view of a diaphragm member constructed according to the present invention;
FIG. 2 is a cross-sectional view of the diaphragm of FIG. 1 taken on line 2—2 thereof;
FIG. 3 is a cross-sectional view of the diaphragm member of FIGS. 1 and 2 showing the member positioned in a mounting assembly;
FIG. 4 is a cross-sectional view showing another form of mounting for the diaphragm member;
FIG. 5 is a plan view of a modified diaphragm member;
FIG. 6 is a cross-sectional view taken on line 6—6 of FIG. 5;
FIG. 7 is an exploded cross-sectional view of another modified diaphragm member, and
FIG. 8 is a block diagram of a circuit for controlling the subject device.

Referring to the drawings by reference numbers, the number 10 in FIGS. 1 and 2 refers to a diaphragm constructed according to the present invention. The diaphragm 10 can be formed of any suitable material such as plastic or metal; it can be formed by two or more adjacent and connected layers of the material; or it can be molded or otherwise formed. An explosive charge 12 or other suitable diaphragm weakening or rupturing means is embedded in or mounted on or adjacent to the diaphragm 10. The charge 12 or other means is connected by insulated leads, such as leads 14 and 16 in FIGS. 1 and 2, and a bridging wire 17 or other element is positioned in or adjacent to the charge and is connected between the leads 14 and 16. When the bridging wire 17 is energized by a suitable electric impulse the charge 12 or other means will explode or burn and damage, rupture or otherwise weaken the diaphragm 10. For example, if the charge 12 is explosive, it will explode when the bridging wire 17 is energized and will rupture the diaphragm 10. In the drawing the diaphragm 10 is shown for illustrative purposes as having a bulge to accommodate the explosive charge 12. In actual constructions, however, the amount of the charge is so small that no significant bulge is noticeable.

In FIG. 3 a diaphragm 10a, similar to diaphragm 10, is shown mounted in a groove 18 in the wall of an opening 19 in a housing member 20. The diaphragm 10a is formed of two or more layers of plastic or other material, such as layers 22 and 24, and an explosive charge 12 is positioned between the two adjacent layers. The insulated leads 14 and 16 extend from the diaphragm and are connected to terminal connectors 26 on the housing member 20. Mounted in this way the diaphragm 10a prevents flow through opening 19. When the charge 12 is exploded, however, the diaphragm 10a ruptures and thereby establishes flow communication through the opening 19.

The explosive charge 12 in the diaphragms 10 and 10a can be substituted for by a pyrotechnic material which becomes hot when energized or even by a compound material which produces a chemical reaction and an accompanying explosion. Such a construction can be used to weaken the diaphragm and make rupture more easy to accomplish or it can be used to burn a hole through the diaphragm. If the diaphragm is under pressure and is merely weakened, the pressure on the diaphragm may be used to cause a rupture, otherwise it is usually necessary and desirable to burn a hole through the diaphragm.

In FIG. 4 is shown a mounting block 28 in which the diaphragm is positioned. The block 28 has two connecting passages 30 and 32 therein. The passage 30 extends through the block 28 and has a threaded outlet port 34 at one end and a threaded inlet port 36 at the other end. The inlet port receives a threaded inlet plug 38. The passage 32 also has a threaded port 40 and is used as an outlet for the diaphragm leads 14 and 16. A shoulder 42 is formed in the inlet port 36 and the diaphragm 10 (or 10a) is positioned in the inlet port 36 adjacent to the shoulder 42. The threaded plug 38 is then installed and has an end surface 44 which engages the diaphragm and compresses it adjacent its periphery into sealed engagement with the shoulder 42 preventing communication between the inlet port 36 and the outlet port 34. During installation of the diaphragm, the leads 14 and 16 are brought out through the port 32 and are connected to suitable control circuits. Once the diaphragm 10 or 10a has been ruptured it can be replaced by another diaphragm simply by removing the plug 38 and disconnecting the leads 14 and 16.

In FIG. 5 is shown a modified form of diaphragm identified by the number 50, in which the explosive or pyrotechnic charge 12 is substituted for by a heater wire or heater element 52 which is energized to weaken or rupture the diaphragm 50. In this construction the diaphragm 50 is weakened or ruptured by energizing the heating element and the amount of heat required can be closely regulated by varying the output or current flow through the heating element 52.

In FIG. 7 is shown, in exploded form, another modified diaphragm construction 60. The diaphragm 60 has embedded therein an explosive charge 62 and a strain gage 64 or similar transducing element. In this construction two metal or plastic diaphragm members 66 and 68 are shown connected together adjacent their peripheries by cement 70. When the diaphragm 60 is used to separate chambers at different pressures, the controlled pressure is preferably on the side of the diaphragm adjacent to the strain gage 64, and the associated metal diaphragm member 68 is preferably made thinner than the member 66. The member 68 is also closed over its whole surface while the member 66 may have suitable openings for the leads 72 and 74 which are connected to the explosive charge 62 and for the leads 76 and 78 which are connected to the strain gage 64. In this construction, the strain gage readings indicate the pressure in the controlled chamber and are used to determine whether or not, and when to rupture the diaphragm 60. Many kinds of transducing elements or strain gages can be used in place of the gage 64. For example, the gage 64 can be substituted for by a thermocouple, a thermister, or any other similar device without departing from the spirit and scope of the invention. Furthermore, the strain gage or other similar device can be used to monitor the temperature or pressure and can be connected by suitable circuit means to automatically trigger the explosive charge when a predetermined condition is present. They can also be connected to provide readings from which an operator can determine when to trigger the charge.

FIG. 8 illustrates a relatively simple circuit for controlling the subject valve device. The circuit includes a Wheatstone bridge 80 having two fixed impedance arms 82 and 84, an adjustable impedance arm 86 and an active impedance arm 88 across which the strain gage or transducer element 64 is connected. The bridge 80 has input corners 90 and 92 which are connected through an isolation transformer 94 to an input source 96, and the bridge has output corners 98 and 100 which are connected to the input of amplifier circuits 102 and 104. The output of the amplifier circuit 104 is connected to a relay circuit including a relay coil 106, a capacitor 108 and a rectifier 110. When the relay coil 106 is energized normally open relay contacts 112 close a circuit which includes a battery 114 in series with the explosive charge to detonate the charge. A circuit somewhat similar to the above described circuit is illustrated in Hoch Patent No. 2,535,133, dated December 26, 1950.

It is also contemplated to use the various forms of diaphragms shown or described herein interchangeably making the obvious necessary changes to meet the particular requirements thereof.

Thus it is apparent that there has been shown and described for illustrative purposes several different forms of rupturable members or diaphragms which can be used to separate adjacent chambers or to communicate the chambers when conditions require. Briefly, the present device comprises a member having adjacent chambers and a wall member separating the chambers, said wall member having means associated therewith for rupturing, weakening or destroying the wall member in response to energization of said means.

Various changes, alterations, modifications and adaptations of the present device will become apparent to those skilled in the art after having considered this disclosure. All such changes, alterations, modifications and adaptations which do not depart from the spirit and scope of the invention are deemed to be covered by the invention which is limited only by the claims which follow.

What is claimed is:

1. A diaphragm for closing a passage in a member comprising a laminated body, a pocket formed in said body between adjacent laminations, an explosive charge capable of producing a chemical reaction and an accompanying explosion of sufficient force to rupture the body, said charge being positioned in said pocket, a strain gage positioned in said pocket adjacent to said charge, and a control circuit including a source of energy capable of detonating the charge, said control circuit being connected to the strain gage and to the explosive charge and responding to a predetermined condition of the strain gage to connect said energy source across said charge.

2. A single operation normally closed valve comprising a body having inlet and outlet compartments, a diaphragm mounted in said body separating said compartments, means on said body sealably engaging and supporting said diaphragm in the aforesaid position between said compartments, a substance positioned inside said diaphragm that is capable when excited electrically of producing a chemical reaction and an accompanying explosion of sufficient magnitude to rupture the diaphragm, a strain responsive element positioned inside the diaphragm adjacent to said substance, and control circuit means connected to said substance and to said strain responsive element, said control circuit means including means responsive to a predetermined condition of the strain responsive element produced by a predetermined pressure differential between the inlet and outlet compartments to electrically excite said substance to produce a rupture in the diaphragm.

3. The valve defined in claim 2 wherein said diaphragm is formed of a flexible plastic-like material.

4. A diaphragm for closing a passage in a member comprising a body of flexible plastic-like material, transducer means and explosive means positioned adjacent to each other on said body, said transducer means responding to predetermined conditions of said body produced by predetermined environmental conditions adjacent thereto, and electric circuit means including a source of electric energy connected to said transducer means and to said explosive means, said circuit means including means responding to a predetermined condition of the transducer means to connect the source of energy to the explosive means whereupon said explosive means produces a chemical reaction and an accompanying explosion of sufficient magnitude to rupture the body.

5. A diaphragm valve comprising a member with a passage therein, a plastic disc positioned closing said passage, means for supporting said disc in said passage closing condition, an explosive charge sealably embedded in said disc, said charge being capable upon being excited electrically of producing a chemical reaction and an accompanying explosion of sufficient magnitude to rupture the disc and open the passage, a control circuit including a source of electric energy operatively connected to said charge and means responsive to stresses in said disc caused by environmental conditions adjacent thereto in the passage, said stress responsive means being sealably embedded in said disc and being operatively connected to said control circuit, said control circuit including means responsive to a predetermined stress condition of the disc to connect said electric energy source to said charge to thereby produce a chemical reaction and an accompanying explosion.

References Cited in the file of this patent

UNITED STATES PATENTS

| | | |
|---|---|---|
| 1,844,367 | Pirani | Feb. 9, 1932 |
| 2,535,998 | Bierman | Dec. 26, 1950 |
| 2,629,801 | Warshaw | Feb. 24, 1953 |
| 2,736,459 | Cockram | Feb. 28, 1956 |
| 2,782,496 | Augustauskas | Feb. 26, 1957 |
| 2,808,114 | Parker | Oct. 1, 1957 |

FOREIGN PATENTS

| | | |
|---|---|---|
| 472,891 | Germany | Mar. 7, 1929 |
| 549,114 | Canada | Nov. 19, 1957 |